United States Patent [19]
Nieweglowski et al.

[11] Patent Number: 6,163,575
[45] Date of Patent: Dec. 19, 2000

[54] MOTION VECTOR FIELD CODING

[75] Inventors: Jacek Nieweglowski, Szczecin, Poland; Marta Karczewicz, Tampere, Finland

[73] Assignee: Nokia Mobile Phones Limited, Espoo, Finland

[21] Appl. No.: 09/051,814

[22] PCT Filed: Oct. 20, 1995

[86] PCT No.: PCT/FI95/00581

§ 371 Date: Jul. 16, 1998

§ 102(e) Date: Jul. 16, 1998

[87] PCT Pub. No.: WO97/16025

PCT Pub. Date: May 1, 1997

[51] Int. Cl.[7] .................................................. H04N 7/32
[52] U.S. Cl. ...................................... 375/240.16; 348/699
[58] Field of Search ................................. 348/384, 384.1, 348/390, 390.1, 402, 402.1, 407, 407.1, 409–413, 409.1–413.1, 415, 415.1, 416, 416.1, 420, 420.1, 699; 375/240, 240.12, 240.16, 240.24; 382/232, 236, 238; H04N 7/32

[56] References Cited

U.S. PATENT DOCUMENTS

| | | | |
|---|---|---|---|
| 5,594,504 | 1/1997 | Ebrahimi | 348/416 |
| 5,760,835 | 6/1998 | Fujiwara et al. | 348/402 |
| 5,818,531 | 10/1998 | Yamaguchi et al. | 348/420 |
| 5,956,467 | 9/1999 | Rabbani et al. | 382/236 |
| 5,978,048 | 11/1999 | Lee | 348/413 |
| 5,982,440 | 11/1999 | Aoki | 348/416 |
| 6,005,626 | 9/1999 | Ding | 348/416 |
| 6,025,879 | 2/2000 | Yoneyama et al. | 348/699 |

FOREIGN PATENT DOCUMENTS

| | | |
|---|---|---|
| 2628864 | 9/1989 | France . |
| 4138517 A1 | 5/1993 | Germany . |

OTHER PUBLICATIONS

"Joint Motion Estimation And Segmentation For Very Low Bit Rate Video Coding", Ebrahimi et al., Visual Commun. & Image Proc. '95, Proc. of the SPIE, vol. 2501, May 1995, pp. 787–798.

"Compact Motion Representation Based On Global Features For Semantic Image Sequence Coding", Labit et al., Visual Communication And Image Processing, '91, Visual Commun., vol. 1605 Nov. 1991 p. 697–708.

"Motion–Based Object Segmentation And Estimation Using The MDL Principle", Zheng et al., IEEE Transactions On Image Processing, vol. 4, Sep. 1995, pp. 1223–1235.

"Region–Based Time– Varying Image Coding At Low Bit–Rate With A High Visual Quality". Wu et al., Visual Communications And Image Processing '95, Proc. of the SPIE, vol. 2501, May 1995, pp. 1442–1452.

"Region Based Motion Estimation And Compensation For Digital TV Sequence Coding", H. Sanson, Proc. of The Picture Coding Symposium, Mar. 1993, pp. 1–2.

(List continued on next page.)

*Primary Examiner*—Richard Lee
*Attorney, Agent, or Firm*—Perman & Green, LLP

[57] ABSTRACT

A video codec includes a motion field coder for minimizing the number of motion coefficients of a motion vector field. In the coder, a first block includes forming a new matrix representation of the motion vector field. The new coded motion vector field is linear. A second main block includes merging pairs of adjacent segments if the combined segment area can be predicted using a common motion field. Merging information is transmitted to a decoder. A third main block includes removing motion field basis functions. After each removing step, the squared prediction error is calculated and removing is continued until the chance of the error is not acceptable. Final motion coefficients are calculated by solving a linear matrix equation. As a result, reduced number of motion coefficients of each segment are obtained. The motion coefficients are transmitted to the decoder.

11 Claims, 4 Drawing Sheets

OTHER PUBLICATIONS

"Region–Based Motion Field Estimation", Wagner et al., Proc Of The Picture Coding Symposium, Mar. 1993, 2 pages.

"Combined Displacement Estimation And Segmentation In Image Sequences", Stiller et al., Intl. Symposium On Fiber Optic Networks And Video, Proc. Of The SPIE, vol. 1977, Apr. 1993, pp. 276–287.

"Representation Of Motion Information For Image Coding", Nguyen et al., Proc. Picture Coding Symposium '90, Mar. 1990, pp. 1–5.

"Region–Based Motion Estimation Using Deterministic Relaxation Schemes For Image Sequence Coding" Nicolas et al., Proc. 1994 Intl. Conference On Acoustics, Speech And Signal Processing; pp. 265–267.

"Efficient Region–Based Motion Estimation And Symmetry Oriented Segmentation For Image Sequence Coding", IEEE Tran. On Circuits And Systems For Video Technology, vol. 4, Jun. 1994, pp. 357–364.

"Matrix Computation", $2^{nd}$ edition, Golub et al., Johns Hopkins University Press, 1989, p. 217–219.

------ SEGMENT BOUNDARIES
——— FRAME BOUNDARY

MOTION VECTOR FIELD CODING

FIELD OF THE INVENTION

The present invention generally relates to video compression. More precisely, the invention relates to a method of coding an estimated motion field and for generating motion information in a video sequence.

BACKGROUND OF THE INVENTION

Figure 1:
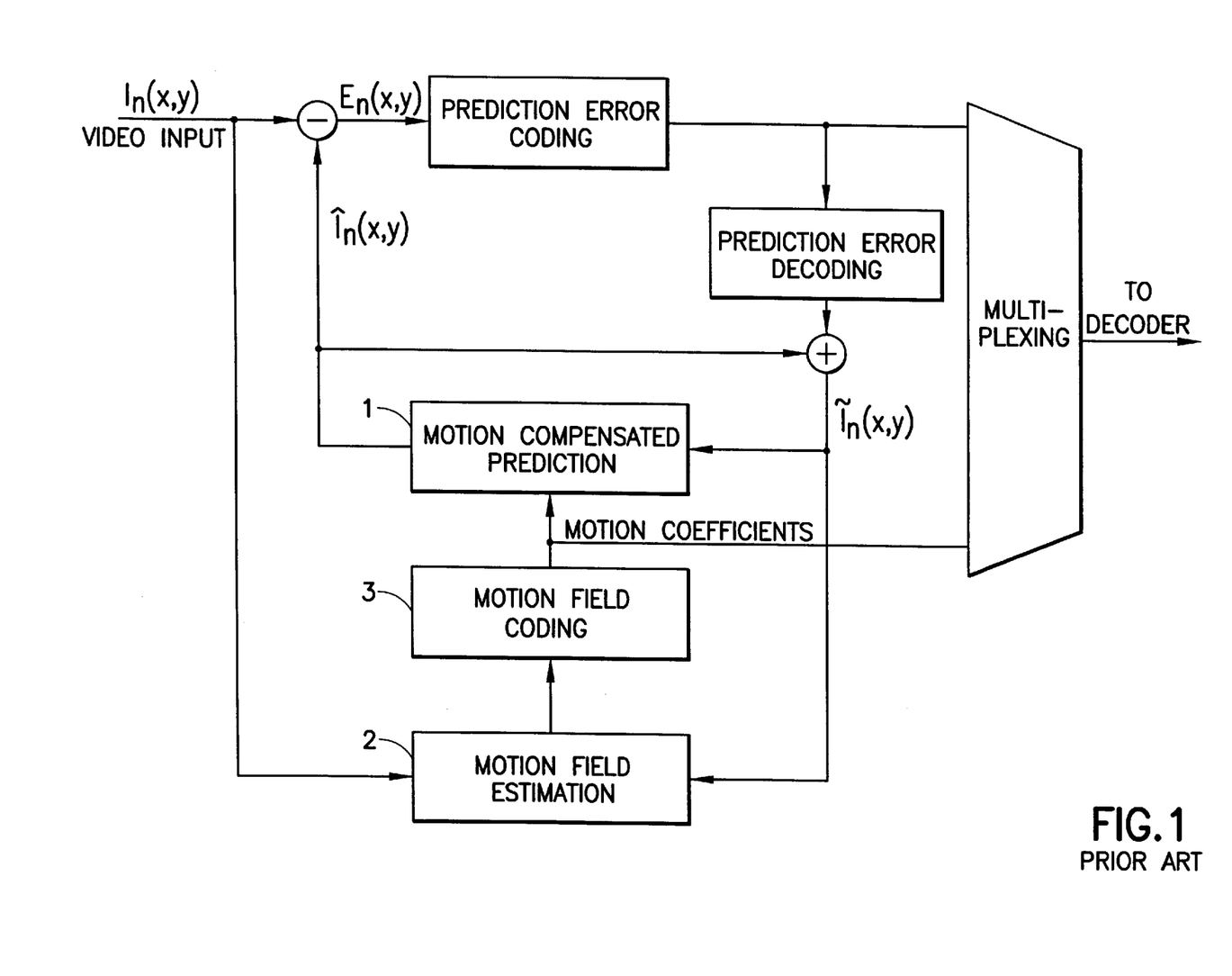
FIG. 1 is a schematic diagram of a known encoder.

The motion compensated prediction is a key element of majority of video coding schemes. FIG. 1 is a schematic diagram of an encoder for compression of video sequences using motion compensation. Essential elements in the encoder are a motion compensated prediction block 1, a motion estimator 2 and a motion field coder 3. The operating principle of the motion compensating video coders is to compress the prediction error $E_n(x,y)$, which is a difference between the incoming frame $I_n(x,y)$ being coded called the current frame and a prediction frame $\hat{I}_n(x, y)$, wherein:

$$E_n(x, y) = I_n(x, y) - \hat{I}_n(x, y) \quad (1)$$

The prediction frame $\hat{I}_n(x, y)$ is constructed by the motion compensated prediction block 1 and is built using pixel values of the previous, or some other already coded frame denoted $\tilde{I}_{n-1}(x, y)$, called a reference frame, and the motion vectors of pixels between the current frame and the reference frame. Motion vectors are calculated by the motion field estimator 2 and the resulting vector field is then coded in some way before applying to the predictor block 1. The prediction frame is then:

$$\hat{I}_n(x, y) = \tilde{I}_{n-1}[x + \Delta x(x, y), y + \Delta y(x, y)] \quad (2)$$

The pair of numbers $[x+\Delta x(x,y), y+\Delta y(x,y)]$ is called the motion vector of pixel in location $(x, y)$ in the current frame, whereas $\Delta x(x,y)$ and $\Delta y(x,y)$ are the values of horizontal and vertical displacement of this pixel. Set of motion vectors of all pixels in the current frame $I_n(x,y)$ is called motion vector field. The coded motion vector field is also transmitted as motion information to the decoder.

Figure 2:
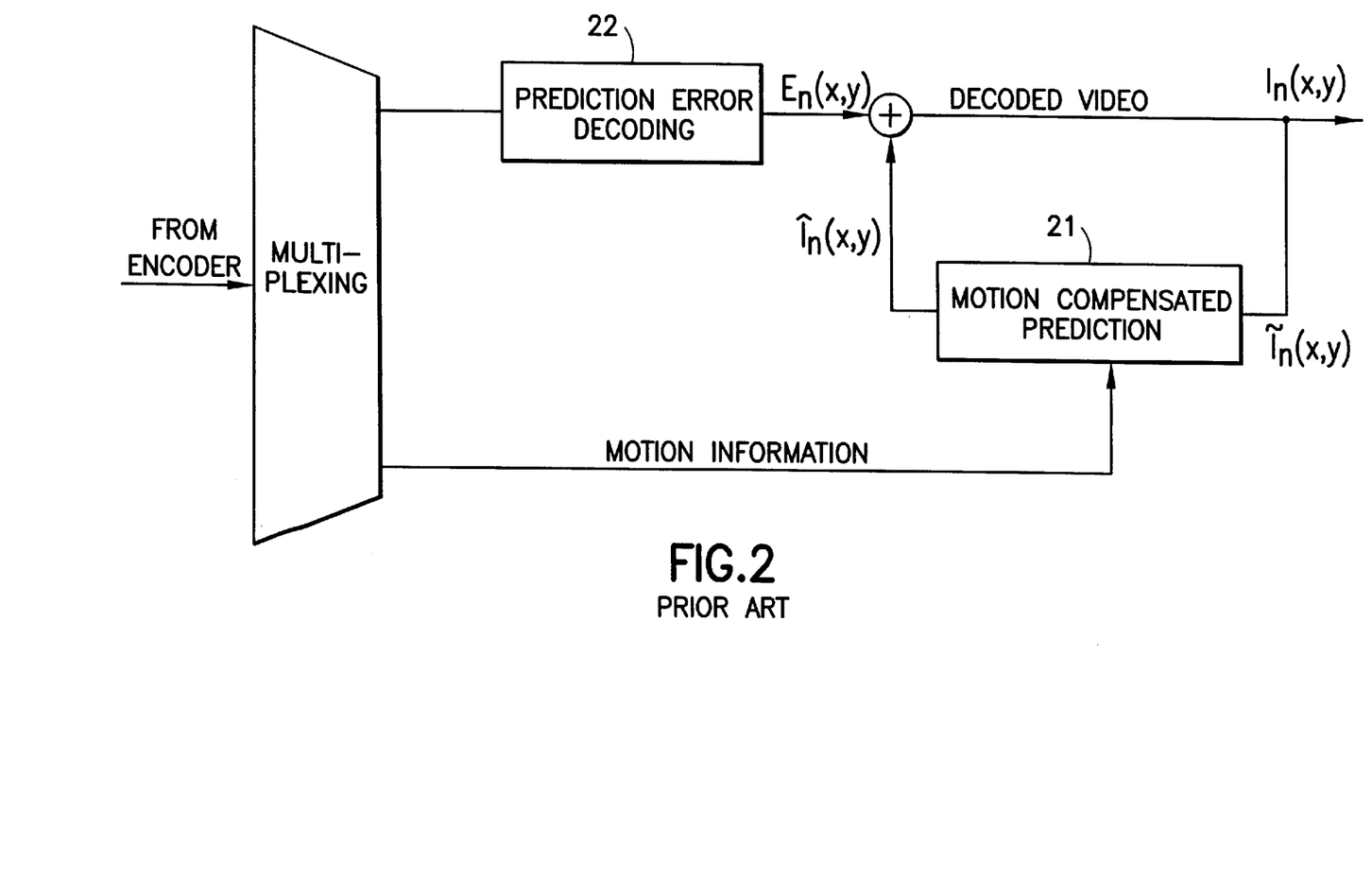
FIG. 2 is a schematic diagram of a known decoder.

In the decoder, FIG. 2, pixels of the current frame $I_n(x,y)$ are reconstructed by finding the pixels' predictions $\hat{I}_n(x, y)$ in the reference frame $\tilde{I}_{n-1}(x, y)$. The motion compensated prediction block 21 generates the prediction frame using the received motion information and the reference frame $\tilde{I}_{n-1}(x, y)$ (in this picture the reference frame is the same as the current frame). In the prediction error decoder 22 decoded prediction error $E_n(x,y)$ is then added with the prediction frame, the result being the original current frame $I_n$.

The general object of the motion compensated (MC) prediction is to minimize amount of information which needs to be transmitted to the decoder. It should minimize the amount of prediction error measured, e.g., as the energy of $E_n(x,y)$, and minimize the amount of information needed to represent motion vector field.

The document H. Nguen, E. Dubois, "Representation of motion information for image coding". Proc. Picture Coding Symposium '90, Cambridge, Mass., Mar. 26–18, 1990, pages 841–845, gives a review of motion field coding techniques. As a rule of the thumb reduction of prediction error requires more sophisticated motion field, i.e., more bits must be spent on its encoding. Therefore the overall goal of the video encoding is to encode as compactly as possible the motion vector field keeping at the same time the measure of prediction error as low as possible.

The motion field estimation block 1, FIG. 1, calculates motion vectors of all the pixels of a given segment which minimize some measure of prediction error in this segment, for example square prediction error. Motion field estimation techniques differ both in the model of the motion field and in the algorithm for minimisation of the chosen measure of prediction error.

Due to very large number of pixels in the frame it is not efficient to transmit a separate motion vector for each pixel. Instead, in most of the video coding schemes the current frame is divided into larger image segments so that all motion vectors of the segment can be described by few parameters. Image segments can be square blocks, e.g. 16×16 pixels blocks are used in codecs in accordance with international standard ISO/IEC MPEG-1 or ITU-T H.261, or they can comprise of completely arbitrarily shaped regions obtained for instance by a segmentation algorithm. In practice segments include at least few tens of pixels.

In order to compactly represent the motion vectors of the pixels in the segment it is desirable that their values are described by a function of few parameters. Such function is called motion vector field model. A known group of models are linear motion models, in which motion vectors are linear combinations of motion field basis functions. In such models the motion vectors of image segments are described by a general formula:

$$\Delta x(x, y) = \sum_{i=1}^{N} c_i f_i(x, y) \quad (3)$$

$$\Delta y(x, y) = \sum_{i=N+1}^{N+M} c_i f_i(x, y)$$

where parameters $c_i$ are called motion coefficients and are transmitted to the decoder. Functions $f_i(x,y)$ are called motion field basis functions which are fixed and known both to encoder and decoder.

The problem when using the linear motion model having the above described formula is how to minimize the number of motion coefficients $c_i$ which are sent to the decoder, preserving at the same time as low measure of prediction error $E_n(x,y)$ as possible. This process is performed in the encoder by the motion field coding block 3, see FIG. 1. It is performed after computationally very complex motion field estimation which is accomplished by the block 2. It is therefore crucial that motion field coding is computationally simple so that it does not impose additional burden on the encoder.

The total number of motion coefficients which needs to be sent to the decoder depends both on number of segments in the image and number of motion coefficients per segment. Therefore, there is at least two ways to reduce the total number of motion coefficients.

The first way is to reduce the number of segments by combining (merging) together those segments which can be predicted with a common motion vector field without causing a large increase of prediction error. The number of segments in the frame can be reduced because very often the adjacent, i.e. neighbouring, segments can be predicted well with the same set of motion coefficients. Process of combining such segments is called motion assisted merging.

The second way is to select for each segment a motion model which allows achieving satisfactorily low prediction error with as few coefficients as possible. Since the amount and the complexity of the motion varies between frames and between segments it is not efficient to use always all N+M motion coefficients per segment. It is necessary to find out for every segment what is the minimum number of motion coefficients which allows to achieve satisfactorily low prediction error. The process of such adaptive selection of coefficients is called motion coefficient removal.

Figure 3:
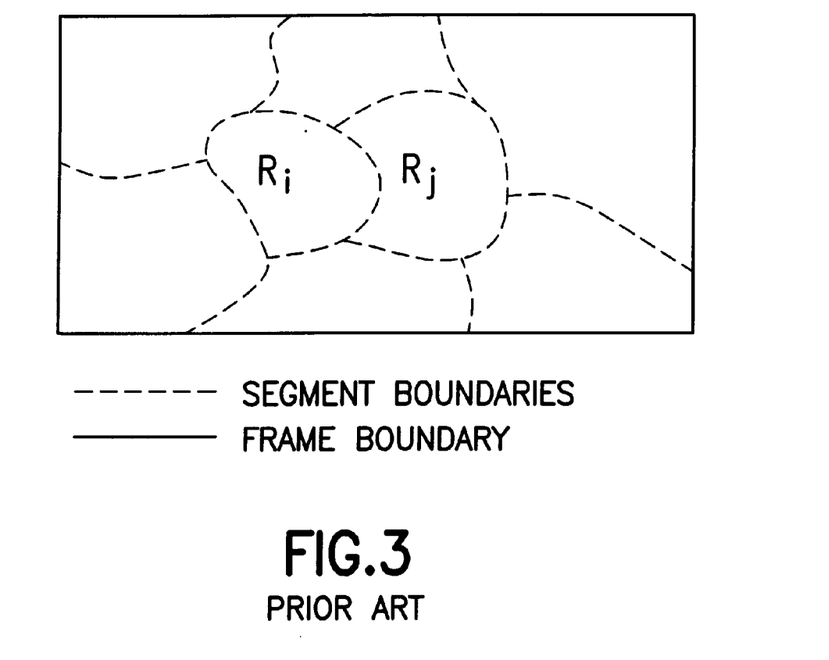
FIG. 3 depicts adjacent segments for merging.

FIG. 3 shows a frame divided into segments. The prior art techniques for motion coefficient coding include several techniques for motion assisted merging. After motion vectors of all the segments have been estimated, the motion assisted merging is performed. It is done by considering every pair of adjacent segments $S_i$ and $S_j$ with their respective motion coefficients $c_i$ and $c_j$. Area of combined segments $S_i$ and $S_j$ is denoted $S_{ij}$. If the area $S_{ij}$ can be predicted with one set of motion coefficients $c_{ij}$ without causing excessive increase of prediction error over the error resulting from separate predictions of $S_i$ and $S_j$, then $S_i$ and $S_j$ are merged. The methods for motion assisted merging differ essentially in the way of finding a single set of motion coefficients $c_{ij}$ which allow a good prediction of segments combined together.

One method is known as merging by exhaustive motion estimation. This method estimates "from scratch" a new set of motion parameters $c_{ij}$ for every pair of adjacent segments $S_i$ and $S_j$. If the prediction error for $S_{ij}$ is not excessively increased then the segments $S_i$ and $S_j$ are merged. Although this method can very well select the segments which can be merged it is not feasible for implementation because it would increase the complexity of the encoder typically by several orders of magnitude.

Another method is known as merging by motion field extension. This method tests whether area of $S_{ij}$ can be predicted using either motion parameters $c_i$ or $c_j$ without an excessive increase of the prediction error. This method is characterised by very low computational complexity because it does not require any new motion estimation. However, it fails to merge segments very often because motion compensation with coefficients calculated for one segment very rarely predicts well also the adjacent segments.

Figure 4:
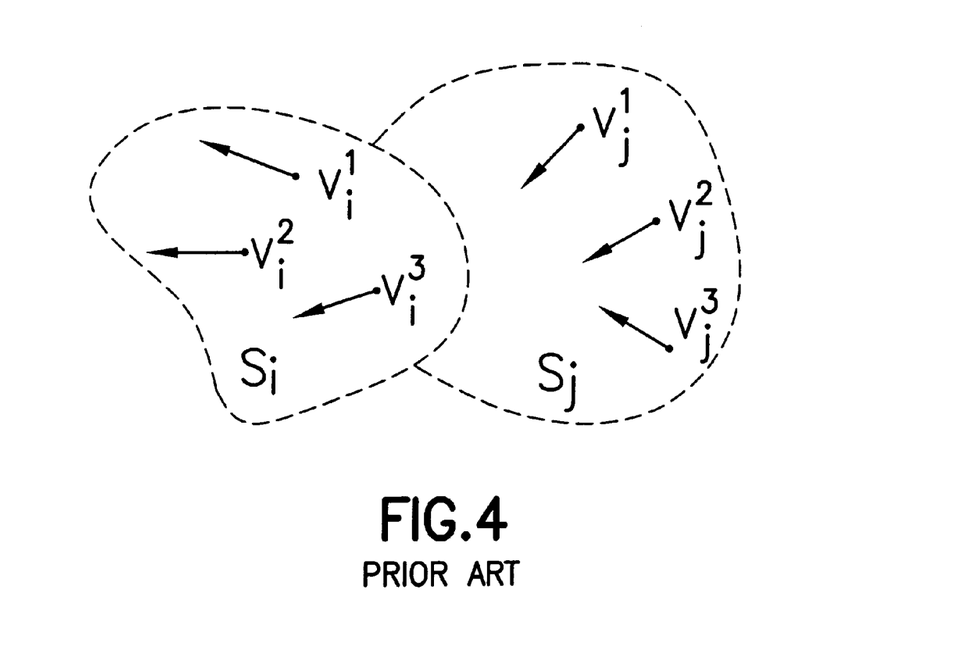
FIG. 4 illustrates merging by motion field approximation.

Still another method is known as merging by motion field fitting. In this method the motion coefficients $c_{ij}$ are calculated by the method of approximation. This is done by evaluating few motion vectors in each of the segments. Some motion vectors in segments $S_i$ and $S_j$ are depicted in FIG. 4. The motion field for the segment $S_{ij}$ is done by fitting a common motion vector field through these vectors using some known fitting method. The disadvantage of the method is that motion field obtained by fitting is not precise enough and often leads to unacceptable increase of prediction error.

Methods for performing motion estimation with different models and selecting the most suitable one are proposed in the documents H. Nicolas and C. Labit, "Region-based motion estimation using deterministic relaxation schemes for image sequence coding," Proc. 1994 International Conference on Acoustics, Speech and Signal Processing, pp. III265–268 and P. Cicconi and H. Nicolas, "Efficient region-based motion estimation and symmetry oriented segmentation for image sequence coding," IEEE Tran. on Circuits and Systems for Video Technology, Vol. 4, No. 3, June 1994, pp. 357–364. The methods try to adapt the motion model depending on complexity of the motion by performing motion estimation with different models and selecting the most suitable one. The main disadvantage of these methods is their high computational complexity and low amount of different motion field models which can be tested in practice.

None of afore described methods alone solves the problem how to minimize the number of motion coefficients $c_i$ which are sent to the decoder, preserving at the same time as low measure of prediction error $E_n(x,y)$ as possible.

SUMMARY OF THE INVENTION

An objective of the present invention is to create a motion field coder which reduces the amount of motion field vector information produced by some known motion estimator by large factor without causing large increase of prediction error. The complexity of the motion field coder should be low for allowing practical implementation on available signal processors or general purpose microprocessors.

In accordance with the invention, the motion field coder includes three main blocks.

The first main block is called a QR motion analyzer. Its task is to find a new representation of the inputted motion field produced by the motion field estimator. This new representation is applied to the second main block. Operations in this first main block include a plurality of steps comprising matrix operations: In the first step the prediction frame is linearized using some known approximation method so that the prediction frame becomes linear with respect to motion vectors. In the second step a matrix $E_i$ and a matrix $y_i$ are constructed for minimisation of the square prediction error. In the third step the well known QR factorization algorithm is used to decompose the matrix $E_i$ into a product of two matrices $Q_i$ and $R_i$. In addition, an auxiliary vector $z_i$ is calculated from the factor matrix $Q_i$ and the matrix $y_i$. Part of the matrix $R_i$ and the auxiliary vector $z_i$ are applied to the second main block.

The secod main block called a segment merging block performs merging operation for pairs of adjacent segments by finding whether their combined area can be predicted using a common motion field. In the matrix operations a matrix equation is firstly formed, thereafter the factor matrices are processed by using known matrix computation methods. The result is a matrix equation, where one matrix includes terms on the basis of which it is easy to calculate the square prediction error in the area of the merged segments. If the change of the square prediction error is acceptable according to a chosen criterion the the segments are merged.

After all pairs of segments are considered the output of the segment merging block is:

i. a new division of the image with reduced number of segments, ii. for each new segment the block outputs matrix $R^1_{ij}$, vector $z^1_{ij}$, iii. merging information which is sent to the decoder and helps the decoder to identify segments which were merged.

The third main block is called a coefficient removal block. The block receives as the input new division of the current frame into segments and for every segment it receives matrices $R^1_k$, $z^1_k$, and $c_k$ produced by the segment merging block. Motion vectors of every segment are represented by a number of motion coefficients. The motion coefficient removal block determines for each of the segments if it is possible to simplify the motion field model, without excessive increase of prediction error. Some basis functions are removed from the motion model, wherein less coefficients are required to describe such a simplified motion field model.

The operations in this third main block are matrix operations, in which the matrix equation is firstly modified by removing one column and row of the factor matrices, then the matrix equation is triangularized. Removal one column and row correspods to removal one basis function from the motion model. The change of the square prediction error for the segment caused by removal of one basis function is equal to the square of one term in equation.

If the change of the prediction error is acceptable according to a chosen criterion then one coefficient is removed from the coefficient set. More coefficients for the segment can be reduced further repeating these matrix operations. After sufficient amount of coefficients has been removed final motion coefficients for the segment are calculated by solving the resulting linear equation. The equation can be solved using one of well known algorithms, e.g., backsubstitution.

This third main block outputs for every processed segment selection information which tells which basis functions were removed from motion field model. Additionally it outputs new motion coefficients corresponding to the remaining basis functions. Both selection information and motion coefficients are transmitted to the decoder.

DESCRIPTION OF THE ILLUSTRATIVE EMBODIMENT

Figure 5:
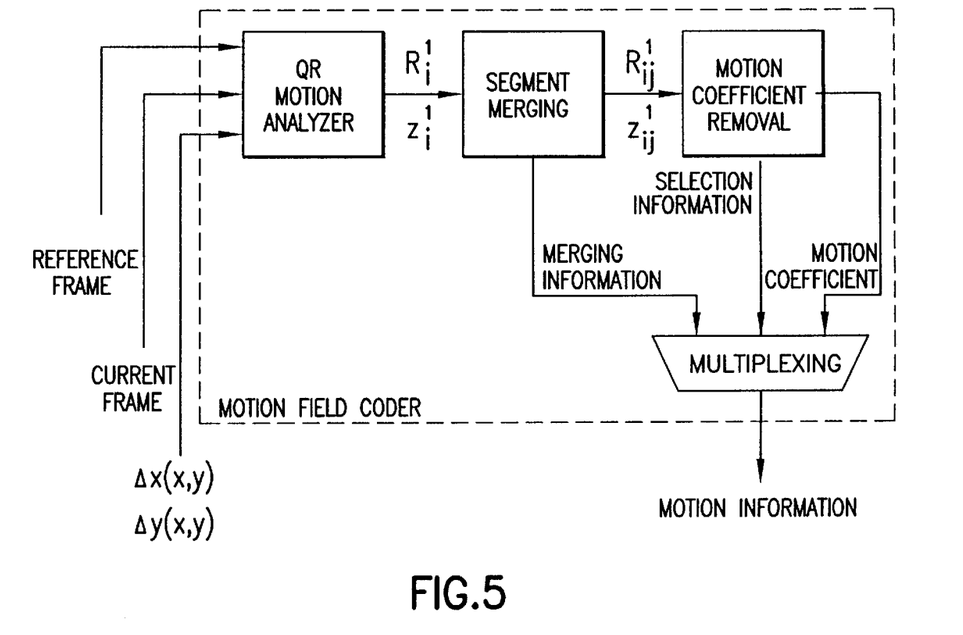
FIG. 5 is the motion field coder according to the invention.

FIG. 5 illustrates the motion field encoder according to the invention. It corresponds to the block 3 in FIG. 1 but it has as inputs also the reference frame and the current frame. The third input to this block is the motion vector field $[\Delta x(\bullet), \Delta y(\bullet)]$ produced by motion field estimation block 2, FIG. 1.

If we imagine, that the output of the video encoder is the compressed frame divided into segments and each of the segments is accompanied by motion coefficients, then for a segment $S_i$ which consists of P pixels with coordinates $(x_i, y_i)$, i=1, 2, ..., P, the task of the motion field coder is to find the motion coefficients $\tilde{c}=(\tilde{c}_1, \tilde{c}_2, \ldots, \tilde{c}_{N+M})$ of a compressed motion vector field $[\Delta x(\bullet), \Delta y(\bullet)]$ where the motion vectors are described by a linear motion model, the field being of the form:

$$\tilde{\Delta}x(x, y) = \sum_{i=1}^{N} \tilde{c}_i f_i(x, y) \quad (4a)$$

$$\tilde{\Delta}y(x, y) = \sum_{i=N+1}^{N+M} \tilde{c}_i f_i(x, y) \quad (4b)$$

such that it minimizes square prediction error:

$$\sum_{i=1}^{P} \left(I_n(x_i, y_i) - \tilde{I}_{n-1}(x_i + \tilde{\Delta}x(x_i, y_i), y_i + \tilde{\Delta}y(x_i, y_i))\right)^2. \quad (5)$$

To fulfill said task, the motion field encoder consists of three main building blocks which are the QR motion analyser block, the segment merging block and the motion coefficient removal block. The segment merging block and the motion coefficient removal block reduce the amount of motion information which results in increase of the square prediction error.

The objective of the QR motion analyzer is to find a new representation of the motion field. This new representation is used later in the other two blocks for a fast and flexible finding of motion coefficients for merged segments and for coefficient removal.

Figure 6:
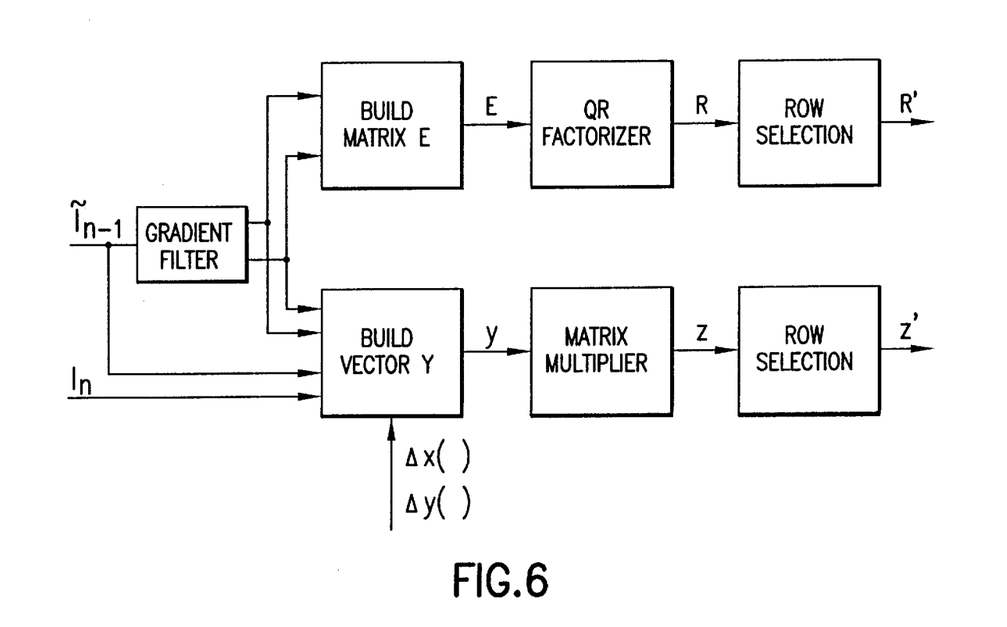
FIG. 6 is a schematic diagram of QR motion analyser.

The operation of QR Motion Analyzer consists of following steps:

Step 1 is linearization of error. In this step the prediction frame $\tilde{I}_{n-1}(\bullet)$ in equation (5) is approximated using some known approximation method so that it becomes linear with respect to $[\Delta x(\bullet), \Delta y(\bullet)]$. Then elements under sum in the formula (5) become linear combinations of coefficients $c_i$ $$\sum_{j=1}^{P} (e_{j,1}\tilde{c}_1 + e_{j,2}\tilde{c}_2 + \cdots + e_{j,N+M}\tilde{c}_{N+M} - y_j)^2 \quad (6)$$

Step 2 is construction of matrices. It is based on the fact that minimisation of the formula (6) is fully equivalent to minimisation of the matrix expression $(E_i\tilde{c}_i - y)^T(E_i\tilde{c}_i - y_i)$, where $E_i$ and $y_i$ are:

$$E_i = \begin{bmatrix} e_{1,1} & e_{1,2} & \cdots & e_{1,N+M} \\ e_{2,1} & e_{2,2} & \cdots & e_{2,N+M} \\ \vdots & \vdots & \vdots & \vdots \\ e_{P,1} & e_{P,2} & \cdots & e_{P,N+M} \end{bmatrix}, y_i = \begin{bmatrix} y_1 \\ y_2 \\ \vdots \\ y_P \end{bmatrix} \quad (7)$$

Step 3 is QR Factorization. The well known QR factorization algorithm is described in the document G. H. Golub and C. van Loan, "Matrix computation" 2nd edition, The Johns Hopkins University Press, 1989. This algorithm is used to decompose $E_i$ into a product of two matrices $$E_i = Q_i R_i \quad (8)$$

In this step is also calculated an auxiliary vector $z_i$ where $$z_i = Q^T y_i \quad (9)$$

In step 4 the output of the QR motion analyzer block is calulated. The output comprises of a matrix $R_i^1$ consisting of N+M first rows of matrix $R_i$ and a vector $z^1_i$ consisting of first N+M elements of $z_i$.

In the segment merging block merging operation is performed for pairs of adjacent segments $S_i$ and $S_j$, see FIG. 4, by finding whether their combined area $S_{ij}$ can be predicted using a common motion field described by motion coefficients $c_{ij}$. Merging operation consists of the following steps:

Step 1 comprises matrix calculation. This invention utilizes a previously unknown property that motion coefficients $c_{ij}$ can be found by solving the system of linear equations:

$$\begin{bmatrix} R_i^1 \\ R_j^1 \end{bmatrix} c_{ij} = \begin{bmatrix} z_i^1 \\ z_j^1 \end{bmatrix} \quad (10)$$

where $R^1_i$, $z^1_i$ and $R^1_j$, $z^1_j$ are already produced by the QR analyzer block for segments $S_i$ and $S_j$ respectively.

Step 2 comprises triangularization of the matrices obtained in the step 1. Matrices $R^1_i$, $R^1_j$ are upper triangular and the system in equation (10) has according to the teaching of the afore mentioned document the form:

$$\begin{bmatrix} x & x & x & \cdots & x \\ & x & x & \cdots & x \\ & & x & \cdots & x \\ & & & \ddots & \vdots \\ & & & & x \\ x & x & x & \cdots & x \\ & x & x & \cdots & x \\ & & x & \cdots & x \\ & & & \ddots & \vdots \\ & & & & x \end{bmatrix} \begin{bmatrix} c_1 \\ c_2 \\ c_3 \\ \vdots \\ c_{N+M} \end{bmatrix} = \begin{bmatrix} z_1^j \\ z_2^j \\ z_3^j \\ \vdots \\ z_{N+M}^j \\ z_1^j \\ z_2^j \\ z_3^j \\ \vdots \\ z_{N+M}^j \end{bmatrix} \quad (11)$$

where symbol x denotes a nonzero element. According to the teaching of the afore mentioned documet, the system is triangularized by applying a series of multiplications of rows by scalars followed by additions of the rows, i.e., it is converted to the form:

$$\begin{bmatrix} r_{1,1} & r_{1,2} & r_{1,3} & \cdots & r_{1,N+M} \\ 0 & r_{2,2} & r_{2,3} & \cdots & r_{2,N+M} \\ 0 & 0 & r_{3,3} & \cdots & r_{3,N+M} \\ 0 & 0 & 0 & \ddots & \vdots \\ 0 & 0 & 0 & 0 & r_{N+M,N+M} \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \begin{bmatrix} c_1 \\ c_2 \\ c_3 \\ \vdots \\ c_{N+M} \end{bmatrix} = \begin{bmatrix} z_1 \\ z_2 \\ z_3 \\ \vdots \\ z_{N+M} \\ q_1 \\ q_2 \\ q_3 \\ \vdots \\ q_{N+M} \end{bmatrix} \quad (12)$$

In the step 3 merging error is evaluated. The change of the square prediction error $\Delta E_{ij}$ in the area $S_{ij}$ caused by merging of segments $S_i$ and $S_j$ is calculated according to the teaching of the afore mentioned document, wherein $$\Delta E_{ij} = \sum_{k=1}^{N+M} q_k^2 \quad (13)$$

Finally, in the step 4 the segments are merged if the change of square prediction error in the formula (13) is acceptable according to a chosen criterion. For the resulting new segment $S_{ij}$ matrix $R^1_{ij}$ and vector $z^1_{ij}$ are built by taking first N+M rows of the system in equation (12), i.e., are given by formula:

$$R^1_{ij} = \begin{bmatrix} r_{1,1} & r_{1,2} & r_{1,3} & \cdots & r_{1,N+M} \\ & r_{2,2} & r_{2,3} & \cdots & r_{2,N+M} \\ & & r_{3,3} & \cdots & r_{3,N+M} \\ & & & \ddots & \vdots \\ & & & & r_{N+M,N+M} \end{bmatrix}, \; z^1_{ij} = \begin{bmatrix} z_1 \\ z_2 \\ z_3 \\ \vdots \\ z_{N+M} \end{bmatrix} \quad (14)$$

After all pairs of segments of the frame are considered the output of the segment merging block is obtained. The output comprises of three kinds of information. Firstly, it gives a new division of the image with reduced number of segments. Secondly, for each new segment the block outputs matrix $R^1_{ij}$, vector $z^1_{ij}$. Thirdly, it gives merging information which is sent to the decoder and helps the decoder to identify segments which were merged.

The motion coefficients $c_{ij}=(c_1, c_2, \ldots c_{N+M})$ for the segment $S_{ij}$ could be now calculated by solving the system of equations $R^1_{ij}c_{ij}=z^1_{ij}$ but their calculation is not necessary if the next block, the coefficient removal block is used.

We consider now operation of the coefficient removal block. The block receives as the input new division of the current frame into segments and for every segment $S_k$ it receives matrices $R^1_k$, $z^1_k$, and $c_k$ produced previously by the segment merging block. Motion vectors of every segment is represented by N+M motion coefficients.

The motion coefficient removal block determines for a given segment $S_k$ if it is possible to simplify the motion field model, without excessively increase of prediction error. Simplified motion field model is obtained when some basis functions are removed from the model in equations (3) described in the background art of this application. Less coefficients are required to describe such a simplified motion field model.

The following procedure is performed for segments in order to find out whether i'th basis function (and i'th coefficient) can be removed from the motion field model:

Step 1 includes matrix modification, where system of linear equations $$R^1_k c_k = z^1_k \quad (15)$$

is modified by removing i'th column from $R^1_k$ and i'th element from $c_k$.

Step 2 includes matrix triangularization, where the system in equation (15) is triangularized in the known manner by applying a series of multiplications of rows by scalars followed by additions of the rows, i.e., it is converted to the form:

$$\begin{bmatrix} r_{1,1} & r_{1,2} & r_{1,3} & \cdots & r_{1,N+M-1} \\ 0 & r_{2,2} & r_{2,3} & \cdots & r_{2,N+M-1} \\ 0 & 0 & r_{3,3} & \cdots & r_{3,N+M-1} \\ 0 & 0 & 0 & \ddots & \vdots \\ 0 & 0 & 0 & \cdots & r_{N+M-1,N+M-1} \\ 0 & 0 & 0 & \cdots & 0 \end{bmatrix} \begin{bmatrix} c_1 \\ c_2 \\ c_3 \\ \vdots \\ c_{N+M-1} \end{bmatrix} = \begin{bmatrix} z_1 \\ z_2 \\ z_3 \\ \vdots \\ z_{N+M-1} \\ q_i \end{bmatrix} \quad (16)$$

Step 3 includes error evaluation. The change of the square prediction error for the segment caused by removal of i'th coefficient is simply equal to the term $q^2_i$ in equation (16).

Step 4 includes removal of coefficients. If the change of the prediction error is acceptable according to a chosen criterion then the coefficient $c_i$ is removed from the coefficient set. The new number of coefficients is now N+M−1. Matrix $R^1_k$ and vector $z^1_k$ are modified to form:

$$R^1_k = \begin{bmatrix} r_{1,1} & r_{1,2} & r_{1,3} & \cdots & r_{1,N+M-1} \\ & r_{2,2} & r_{2,3} & \cdots & r_{2,N+M-1} \\ & & r_{3,3} & \cdots & r_{3,N+M-1} \\ & & & \ddots & \vdots \\ & & & & r_{N+M-1,N+M-1} \end{bmatrix}, \; z^1_k = \begin{bmatrix} z_1 \\ z_2 \\ z_3 \\ \vdots \\ z_{N+M-1} \end{bmatrix} \quad (17)$$

Number of coefficients for the segment can be reduced further by using matrices (17) in the equation (15) and repeating the steps 1–4.

Step 5 includes coefficient calculation. After sufficient amount of coefficients has been removed, this step is started. In this step final motion coefficients for a segment $S_k$ are calculated by solving the system of linear equations:

$$R^1_k c_k = z^1_k \quad (18)$$

where matrix $R^1{}_k$ and vector $z^1{}_k$ are the result of the previous steps 1–4. The equation can be solved using one of well known algorithms, e.g., back-substitution.

The motion coefficient removal block outputs for every processed segment selection information which tells to the decoder which basis functions were removed from motion field model. Additionally it outputs new motion coefficients corresponding to the remaining basis functions. Both selection information and motion coefficients are transmitted to the decoder.

As a result of all of the steps in all of the blocks, the motion field coder according to the invention produces merging information telling to the decoder which segments are merged, selection information telling to the decoder which basis functions are removed and motion coefficient information.

The main advantage of the present invention over prior art solutions is its ability to reduce the amount of motion information by large factor without causing large increase of prediction error. Additionally the complexity of the overall system is low which allows practical implementation on available signal processors or general purpose microprocessors.

The segment merging block has a unique ability of finding motion vectors of combined segments from given motion vectors estimated for separate segments. It can be proven that the motion vectors it produces are in fact optimal in terms of keeping minimal square error for the combined segment. This explains the ability of this block to dramatically reduce the number of segments with only very modest increase of square prediction error.

The motion coefficient removal block is a very powerful tool for instantaneous adaptation of the motion model to the actual amount and type of motion in the video scene. This block can easily test the result of prediction (value of square prediction error for a segment) with a very large number of models, e.g., with all possible combinations of motion field basis functions. No other known method has this amount of flexibility. A strong advantage of this scheme is that it does not need to repeat process of motion estimation hence is computationally simple.

By using motion estimation followed by QR motion analyzer the motion field coder can find new motion coefficients for any desired combination of image segments or any desired model of the motion field in the segment by solving very simple systems of linear equations.

DESCRIPTION OF THE PREFERRED EMBODIMENT

In the preferred implementation quadratic polynomial motion vector field model with 12 coefficients is used:

$$\Delta x(x, y) = c_1 + c_2 x + c_3 y + c_4 xy + c_5 x^2 + c_6 y^2$$

$$\Delta y(x, y) = c_7 + c_8 x + c_9 y + c_{10} xy + c_{11} x^2 + c_{12} y^2$$

This model in practice can handle very well even very complex motion in video sequences and yields good prediction results.

In the QR motion analyzer block, linearization in the step 1 is done by using Taylor expansion of $\tilde{I}_{n-1}(\bullet)$ at every pixel $(x_i, y_i)$ where $i = 1, 2, \ldots, P$ around points:

$$x'_i = x_i + \Delta x(x_i, y_i)$$

$$y'_i = y_i + \Delta y(x_i, y_i)$$

Using property that $\Sigma a^2 = \Sigma(-a)^2$, the prediction error is then $$\sum_{i=1}^{P} (\tilde{I}_{n-1}(x'_i, y'_i) + (\tilde{\Delta} x(x_i, y_i) - \Delta x(x_i, y_i))G_x(x'_i, y'_i) +$$

$$(\tilde{\Delta} y(x_i, y_i) - \Delta y(x_i, y_i))G_y(x'_i, y'_i) - I_n(x_i, y_i))^2$$

Auxiliary values $g_j(x,y)$ are calculated using formula:

$$g_j(x_i, y_i) = \begin{cases} f_j(x_i, y_i)G_x(x_i, y_i) & \text{when } j = 1, 2, \ldots, N \\ f_j(x_i, y_i)G_y(x_i, y_i) & \text{when } j = N+1, N+2, \ldots, N+M \end{cases}$$

where function $f_j(x_i, y_i)$ is basis function as defined in the equations (4a) and (4b).

Matrix E and vector y in equation (9) are built using formulas:

$$E = \begin{bmatrix} g_1(x_1, y_1) & g_2(x_1, y_1) & \cdots & g_{N+M}(x_1, y_1) \\ g_1(x_2, y_2) & g_2(x_2, y_2) & \cdots & g_{N+M}(x_2, y_2) \\ \vdots & \vdots & \vdots & \vdots \\ g_1(x_P, y_P) & g_2(x_P, y_P) & \cdots & g_{N+M}(x_P, y_P) \end{bmatrix},$$

$$y = \begin{bmatrix} I_n(x_1, y_1) - \tilde{I}_{n-1}(x'_1, y'_1) + G_x(x'_1, y'_1)\Delta x(x_1, y_1) + G_y(x'_1, y'_1)\Delta y(x_1, y_1) \\ I_n(x_2, y_2) - \tilde{I}_{n-1}(x'_2, y'_2) + G_x(x'_2, y'_2)\Delta x(x_2, y_2) + G_y(x'_2, y'_2)\Delta y(x_2, y_2) \\ \vdots \\ I_n(x_P, y_P) - \tilde{I}_{n-1}(x'_P, y'_P) + G_x(x'_P, y'_P)\Delta x(x_P, y_P) + G_y(x'_P, y'_P)\Delta y(x_P, y_P) \end{bmatrix}.$$

$G_x(x,y)$ and $G_y(x,y)$ are values of the horizontal and vertical gradient of the reference frame $\tilde{I}_{n-1}(x,y)$ calculated using following formula:

$$G_x(x, y) = \tilde{I}_{n-1}(x+1, y) - \tilde{I}_{n-1}(x-1, y),$$

$$G_y(x, y) = \tilde{I}_{n-1}(x, y+1) - \tilde{I}_{n-1}(x, y-1).$$

FIG. 6 shows a schematic diagram of QR Motion Analyzer. Row selection block selects only N+M first rows of the input matrix. In the segment merging block following strategy for segment merging is used:
 a. a threshold T is selected which corresponds to allowed increase of square prediction error in whole frame.
 b. for all pairs of adjacent segments $\Delta E_{ij}$ is calculated using equation (13).

c. pair of segments with smallest $\Delta E_{ij}$ is merged.

d. points b–c are repeated until sum of $\Delta E_{ij}$ corresponding to all merged pairs of segments is greater than T.

For triangularization of system in equation (11) a sequence of Givens rotations is used.

In the motion coefficient removal block the following strategy for coefficient removal is used:

a. a threshold T is selected which corresponds to allowed increase of square prediction error in whole frame.

b. for all segments and all basis functions $q_i^2$ is calculated using equation (16).

c. basis function of a segment with smallest $q_i^2$ is removed.

d. points b–c are repeated until sum of all $q_i^2$'s corresponding to all removed basis functions in different segments is greater than T.

The system in formula (16) is triangularized using a sequence of Givens rotations.

The final motion coefficients of segments are calculated by solving equation (18) using backsubstitution algorithm.

The pixel values of $\tilde{I}_{n-1}(x,y)$, $G_x(x,y)$ and $G_y(x,y)$ are defined only for integer coordinates x and y. In many instances when x or y are noninteger the pixel value is calculated using bilinear interpolation of closest pixels with integer coordinates.

The system can be implemented in a variety of ways without departing from the spirit and scope of the invention. For instance, different linear motion models can be used in equations (3). Different methods can be used to linearize the term in the formula (5). Further, different criteria may be used to decide whether to merge or not to merge two segments. The strategy for deciding whether a given basis function should be removed from the model may vary. Triangularization of matrices in equations (10) and (15) can be performed using various algorithms and calculation of final coefficients by solving equation (18) can be done using a number of known algorithms for solving systems of linear equations. Finally, different interpolation methods can be used to values of $\tilde{I}_{n-1}(x,y)$, $G_x(x,y)$ and $G_y(x,y)$ in noninteger coordinates.

What is claimed is:

1. A video codec for coding a current frame $I_n$ of a video sequence, the video codec comprising a motion field coder to provide a coded motion vector field, the motion field coder comprising:

a motion analyser arranged to receive
the current frame $I_n$,
a reference frame $\tilde{I}_{n-1}$, and
a motion vector field, and arranged to find a new representation of the motion vector field, the representation involving, for each segment $S_i$ of a plurality of image segments of the current frame $I_n$, a linear motion model based on a set of N+M motion coefficients represented by a vector $c_i$ and a set of basis functions, the motion analyser including
prediction error linearisation means for approximating, for each segment $S_i$ of the current frame, a prediction error function based on that current frame segment and a segment of the reference frame $\tilde{I}_{n-1}$, on the basis of the matrix expression $E_i c_i - y_i$, where $E_i$ is a matrix and $y_i$ is a vector, and matrix processing means for forming, for each current frame segment, from said matrix expression, a first matrix $R_i^1$ and a first vector $z_i^1$, where $R_i^1 c_i = z_i^1$ and the number of rows of the first matrix $R_i^1$ equals the number of motion coefficients N+M;

segment merging means
coupled to the motion analyser to receive first matrices $R_i^1$ and first vectors $z_i^1$, and arranged
for pairs of adjacent segments $(S_i,S_j)$ of the current frame $I_n$, to determine a merged matrix $R_{ij}^1$ and a merged vector $z_{ij}^1$ from the respective pairs of first matrices $R_i^1$, $R_j^1$ and first vectors $z_i^1$, $z_j^1$, and to replace pairs of first matrices $R_i^1$ and first vectors $z_i^1$ with the merged matrix $R_{ij}^1$ and merged vector $z_{ij}^1$ where the latter give a prediction error within a predefined limit, and to merge the corresponding segment pairs; and coefficient removal means coupled to the segment merging means
to receive the remaining first matrices $R_i^1$ and first vectors $z_i^1$ and the replacement merged matrices $R_{ij}^1$ and merged vectors $z_{ij}^1$, and arranged,
for each segment or merged segment of the current frame $I_n$, to use a corresponding matrix $R_k^1$ and vector $z_k^1$ to determine a reduced set of motion coefficients $c_k$ such that the change in the approximated prediction error function is within a predefined limit, and to provide an encoded version of the current frame $I_n$ comprising, for each segment or merged segment, said reduced set of motion coefficients and an indication of which coefficients have been omitted.

2. A video codec according to claim 1, wherein the function of the prediction error, approximated by the motion analyser for each segment of the current frame, is $$\sum_{j=1}^{P}(e_{j,1}\tilde{c}_1 + e_{j,2}\tilde{c}_2 + \cdots + e_{j,N+M}\tilde{c}_{N+M} - y_i)^2$$

where $$E_i = \begin{bmatrix} e_{1,1} & e_{1,2} & \cdots & e_{1,N+M} \\ e_{2,1} & e_{2,2} & \cdots & e_{2,N+M} \\ \vdots & \vdots & \vdots & \vdots \\ e_{P,1} & e_{P,2} & \cdots & e_{P,N+M} \end{bmatrix} \text{ and } y_i = \begin{bmatrix} y_1 \\ y_2 \\ \vdots \\ y_P \end{bmatrix}.$$

3. A video codec according to claim 1, wherein said matrix processing means includes QR factorisation means for decomposing the matrix $E_i$ into a product of a matrix $Q_i$ and $R_i$, and for forming an auxiliary vector $z_i$ where $z_i = Q_i^T y_i$, and for forming $R_i^1$ from the first N+M rows of matrix $R_i$ and vector $z_i^1$ from the first N+M elements of vector $z_i$.

4. A video codec according to claim 1, wherein the segment merging means includes means for triangularising, for said pairs of adjacent segments $(S_i,S_j)$, the equation $$\begin{bmatrix} R_i^1 \\ R_j^1 \end{bmatrix} c_{ij} = \begin{bmatrix} z_i^1 \\ z_j^1 \end{bmatrix}$$

to the form $$\begin{bmatrix} r_{1,1} & r_{1,2} & r_{1,3} & \cdots & r_{1,N+M} \\ 0 & r_{2,2} & r_{2,3} & \cdots & r_{2,N+M} \\ 0 & 0 & r_{3,3} & \cdots & r_{3,N+M} \\ 0 & 0 & 0 & \ddots & \vdots \\ 0 & 0 & 0 & 0 & r_{N+M,N+M} \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \begin{bmatrix} c_1 \\ c_2 \\ c_3 \\ \vdots \\ c_{N+M} \end{bmatrix} = \begin{bmatrix} z_1 \\ z_2 \\ z_3 \\ \vdots \\ z_{N+M} \\ q_1 \\ q_2 \\ q_3 \\ \vdots \\ q_{N+M} \end{bmatrix}$$

where $c_{ij}$ is the set of N+M motion coefficients of the merged adjacent pair of segments.

5. A video codec according to claim 4, wherein the segment merging means is arranged to determine if the prediction error is within a predefined limit by calculating the change in squared prediction error $\Delta E_{ij}$ for each adjacent pair of segments $(S_i, S_j)$ according to $$\Delta E_{ij} = \sum_{k=1}^{N+M} q_k^2.$$

6. A video codec according to claim 4, wherein the segment merging means is arranged to determine said merged matrix $R_{ij}^1$ and said merged vector $z_{ij}^1$ using the first N+M rows of the triangularised matrix equation such that $$R_{ij}^1 = \begin{bmatrix} r_{1,1} & r_{1,2} & r_{1,3} & \cdots & r_{1,N+M} \\ & r_{2,2} & r_{2,3} & \cdots & r_{2,N+M} \\ & & r_{3,3} & \cdots & r_{3,N+M} \\ & & & \ddots & \vdots \\ & & & & r_{N+M,N+M} \end{bmatrix}, z_{ij}^1 = \begin{bmatrix} z_1 \\ z_2 \\ z_3 \\ \vdots \\ z_{N+M} \end{bmatrix}.$$

7. A video codec according to claim 1, wherein said encoded version of the current frame $I_n$ contains an identification of the merged segments.

8. A video codec according to claim 1, wherein said coefficient removal means is arranged to determine a reduced number of motion coefficients $c_k$ for each segment by selectively removing the ith column from the matrix $R_k^1$ and the ith element from the vector $z_k^1$ and thereby to provide a reduced matrix equation $R_k^1 c_k = z_k^1$.

9. A video codec according to claim 8, wherein the coefficient removal means is arranged to triangularise the reduced matrix equation to the form $$\begin{bmatrix} r_{1,1} & r_{1,2} & r_{1,3} & \cdots & r_{1,N+M-1} \\ 0 & r_{2,2} & r_{2,3} & \cdots & r_{2,N+M-1} \\ 0 & 0 & r_{3,3} & \cdots & r_{3,N+M-1} \\ 0 & 0 & 0 & \ddots & \vdots \\ 0 & 0 & 0 & 0 & r_{N+M-1,N+M-1} \\ 0 & 0 & 0 & 0 & 0 \end{bmatrix} \begin{bmatrix} c_1 \\ c_2 \\ c_3 \\ \vdots \\ c_{N+M-1} \end{bmatrix} = \begin{bmatrix} z_1 \\ z_2 \\ z_3 \\ \vdots \\ z_{N+M-1} \\ q_i \end{bmatrix}$$

and to calculate the change in squared prediction error according to $$\Delta E_k = q_i^2.$$

10. A video codec according to claim 9, the coefficient removal means being arranged to remove the motion coefficient $c_i$ from the coefficient matrix $c_k$ if the change is the squared prediction error is within a predefined limit, and to reformulate the triangularised matrix equation by removing the bottom row therefrom.

11. A video codec according to claim 1, wherein the coefficient removal means is arranged to determine the motion coefficients $c_k$ by solving the matrix equation $R_k^1 c_k = z_k^1$.

* * * * *

UNITED STATES PATENT AND TRADEMARK OFFICE
CERTIFICATE OF CORRECTION

PATENT NO. : 6,163,575  
DATED : December 19, 2000  
INVENTOR(S) : Jacek Nieweglowski; Marta Karczewicz Page 1 of 1

It is certified that error appears in the above-identified patent and that said Letters Patent is hereby corrected as shown below:

Column 13, claim 4,  
Line 6,  "0 0 0 .· :" should read --0 0 0 ·. :--.

Column 13, claim 6,  
Line 30,  ".· :" should read --·. :--.

Column 14, claim 9,  
Line 19,  "0 0 0 .· :" should read --0 0 0 ·. :--.

Column 14, claim 10,  
Line 31, "change is" should read -- change in --.

Signed and Sealed this

Fifth Day of February, 2002

Attest:

JAMES E. ROGAN  
*Attesting Officer*     *Director of the United States Patent and Trademark Office*